United States Patent
Schmidt et al.

(10) Patent No.: US 10,589,641 B2
(45) Date of Patent: Mar. 17, 2020

(54) METHOD FOR OPERATING A MOTOR VEHICLE AND MOTOR VEHICLE

(71) Applicant: Daimler AG, Stuttgart (DE)

(72) Inventors: Juergen Schmidt, Weil im Schoenbuch (DE); Miriam Hosak, Lohr am Main (DE); Hanna Bellem, Stuttgart (DE)

(73) Assignee: Daimler AG, Stuttgart (DE)

( * ) Notice: Subject to any disclaimer, the term of this patent is extended or adjusted under 35 U.S.C. 154(b) by 68 days.

(21) Appl. No.: 15/764,770

(22) PCT Filed: Aug. 26, 2016

(86) PCT No.: PCT/EP2016/001436
§ 371 (c)(1),
(2) Date: Mar. 29, 2018

(87) PCT Pub. No.: WO2017/054897
PCT Pub. Date: Apr. 6, 2017

(65) Prior Publication Data
US 2018/0272895 A1   Sep. 27, 2018

(30) Foreign Application Priority Data
Oct. 2, 2015   (DE) .................... 10 2015 012 833

(51) Int. Cl.
*B60N 2/02*   (2006.01)
*B60N 2/00*   (2006.01)
(Continued)

(52) U.S. Cl.
CPC ......... *B60N 2/0248* (2013.01); *B60N 2/0232* (2013.01); *B60N 2/0244* (2013.01);
(Continued)

(58) Field of Classification Search
CPC .... B60N 2/02; B60N 2/16; B60N 3/00; B60R 22/26; B62D 5/04; G06F 17/00; G06F 19/00; H01H 9/00
See application file for complete search history.

(56) References Cited

U.S. PATENT DOCUMENTS 2,111,519 A * 3/1938 Whedon ............... B60N 2/1615
248/419
4,473,724 A * 9/1984 Suzuki ................... B60K 37/06
200/5 R
(Continued)

FOREIGN PATENT DOCUMENTS

DE        42 26 747 C1   12/1993
DE  10 2006 006 995 A1    8/2007
(Continued)

OTHER PUBLICATIONS

PCT/EP2016/001436, International Search Report dated Nov. 28, 2016 (Two (2) pages).

*Primary Examiner* — Yuri Kan
(74) *Attorney, Agent, or Firm* — Crowell & Moring LLP

(57) ABSTRACT

A method for operating a motor vehicle which can be operated in an automated driving mode in which the motor vehicle is driven automatically by means of a computing device includes receiving at least one input for activating the automated driving mode, determining the current position of a first component of the motor vehicle and, depending on the input received and the determined current position, predetermining an adjusting region including the determined current position within which adjusting region movements of the first component relative to a second component of the motor vehicle caused by the driver via a motor allocated to the first component are permitted.

10 Claims, 1 Drawing Sheet

(51) Int. Cl.
  *B60N 2/16* (2006.01)
  *B60R 22/26* (2006.01)
  *G05D 1/02* (2020.01)
  *B60R 1/04* (2006.01)
  *B60R 1/07* (2006.01)
  *B60R 22/04* (2006.01)
  *B62D 1/181* (2006.01)
  *G05D 1/00* (2006.01)

(52) U.S. Cl.
  CPC ............. *G05D 1/021* (2013.01); *B60R 1/04* (2013.01); *B60R 1/07* (2013.01); *B60R 22/04* (2013.01); *B62D 1/181* (2013.01); *G05D 1/0061* (2013.01)

(56) References Cited

U.S. PATENT DOCUMENTS

| | | | |
|---|---|---|---|
| 9,248,743 | B2 | 2/2016 | Enthaler et al. |
| 9,340,126 | B2 * | 5/2016 | Cuddihy ............... B60N 2/143 |
| 2001/0030440 | A1 * | 10/2001 | Ney ..................... B60N 2/0228 296/65.15 |
| 2004/0026947 | A1 * | 2/2004 | Kitano ..................... B60R 7/04 296/24.34 |
| 2005/0027415 | A1 * | 2/2005 | Iwazaki ............. B62D 15/0285 701/36 |
| 2006/0090952 | A1 * | 5/2006 | Ito ..................... B62D 15/0235 180/446 |
| 2009/0322141 | A1 * | 12/2009 | Matsushita ............. B60R 22/03 297/483 |
| 2012/0022749 | A1 * | 1/2012 | Clegg ..................... B60R 1/025 701/49 |

FOREIGN PATENT DOCUMENTS

| | | |
|---|---|---|
| DE | 10 2008 057 861 A1 | 5/2010 |
| DE | 10 2013 012 750 A1 | 2/2015 |
| DE | 10 2014 002 187 A1 | 8/2015 |
| DE | 10 2014 003 023 A1 | 9/2015 |
| EP | 2 840 000 A2 | 2/2015 |
| JP | 59-200315 A | 11/1984 |
| WO | WO 2015/011866 A1 | 1/2015 |

* cited by examiner

METHOD FOR OPERATING A MOTOR VEHICLE AND MOTOR VEHICLE

BACKGROUND AND SUMMARY OF THE INVENTION

The invention relates to a method for operating a motor vehicle and such a motor vehicle.

It is known from the general prior art and, in particular, from mass vehicle production that motor vehicles, in particular passenger vehicles, have first components, for example in the form of seating systems, steering handles, in particular steering wheels, and mirrors, in particular in the form of exterior mirrors and interior mirrors. In order to achieve a high level of comfort for occupants, in particular the driver, of the motor vehicle, at least one motor, in particular in the form of an electric motor, is allocated to the respective first component, by means of which motor the respective first component can be moved relative to at least one second component of the motor vehicle into different positions and can be fixed in the different positions relative to the second component. In the case of the seating system formed, for example, as a vehicle seat or an individual seat, the second components is, for example, the floor or a floor element of the motor vehicle, such that the seating system, for example, can be moved relative to the floor by means of the motor.

In particular, the seating system can be moved, in particular shifted, in the longitudinal direction of the vehicle relative to the floor, such that different longitudinal locations or longitudinal positions of the seating system can be set by moving the seating system in the longitudinal direction of the vehicle. To do so, the driver does not have to move the seating system with his/her own strength, but the driver activates at least one operating element, such as a button, for example, in order to thereby cause movements of the respective first component relative to the respective second component via the motor. Thus, the driver can move the first component relative to the second component, in particular move manually, wherein manual movement is to be understood as the driver manually operating, for example, the operating element mentioned above and thus causing movements of the first component via the motor, such that the first component is moved relative to the second component by means of the motor. With respect to the seating system, the driver can set different seat positions, for example, via the motor.

For example, the first component is a backrest of the seating system, which can be moved, in particular pivoted, relative to a seat part of the seating system by means of the motor. Furthermore, the first component can be formed as the seat part, wherein a seat cushion depth and/or a height of the seat part, for example, can be set by means of the motor. The movements and thus the settings of the first component, in particular the backrest, can take place, for example, via at least one lumbar support and/or at least one air chamber, wherein the lumbar support can be formed by such an air chamber. Here, the lumbar support can be formed as a multi-way lumbar support in order to achieve a high level of seating comfort. In order to move the first component, the air chamber is filled with air, for example. This takes place, for example, by means of a pump, by means of which air is conveyed into the air chamber, wherein the pump is powered by means of the motor mentioned above. Furthermore, it is conceivable that the first component is a side plate of the seating system, in particular the backrest.

Moreover, the first component can be a headrest of the seating system, which can be held on a backrest and moved relative to the backrest. Here, it is conceivable that the headrest can be moved horizontally or in the vertical direction of the vehicle and/or vertically or in the transverse direction of the vehicle. Furthermore, it is conceivable that the first component is a part, in particular a side part, of the headrest which can be moved relative to a further part of the headrest. Thus, a particularly comfortable headrest can be achieved. The first component can be a component of a multi-contour seat, the contour of which, in particular the outer contour, on which a seat occupant can sit, can be varied as a result of movement of the first component, i.e., can be set.

The first component can, furthermore, be a massage element which can be moved by means of the motor. The movement can be understood as the first component, in particular the massage element, changing in terms of its volume, by a medium, for example, in particular a gas such as air, being conveyed into the massage element and being released from the massage element. The medium is, for example, conveyed by means of a pump that is powered by means of the motor.

Furthermore, it is possible that the driver can move the steering wheel and exterior mirror and interior mirror of the motor vehicle by means of a respective motor into different positions or locations in order to thus set these first components with respect to their respective position as needed. In particular, the driver can move or set the first components in order to set a comfortable and, at the same time, safe seating position when driving, i.e., when driving the motor vehicle. Here, the setting of the respective first components can take place in a particularly comfortable manner for the driver, since the driver no longer has to move the respective first component with his/her own strength, but respective movements of the first components can be caused by the motor.

Furthermore, motor vehicles are known from the general prior art that can be operated in an automated driving mode. In this automated driving mode, the respective motor vehicle can be driven automatically by means of a computing device, in particular of the motor vehicle. This is to be understood as movements, in particular movement changes, of the motor vehicle being caused in an automated or automatic manner by means of the computing device in the automated driving mode. For example, in the automated driving mode, the longitudinal dynamics and/or the transverse dynamics of the motor vehicle are set, in particular regulated, in an automatic or automated manner by means of the computing device, i.e., without intervention by the driver. In other words, a longitudinal dynamic regulation and/or transverse dynamic regulation take place, for example, in the automated driving mode by means of the computing device. In the context of the longitudinal dynamic regulation, the computing device causes motor intervention and/or brake intervention, for example, for accelerating and braking the motor vehicle, such that it is accelerated or slowed down without driver intervention. Alternatively or in addition, it is possible that steering interventions take place by means of the computing device, such that direction changes of the vehicle, for example, are caused by the computing device without the driver's intervention.

Here, a vehicle is known from DE 10 2014 223 094 A1, wherein the vehicle comprises an interior space and at least one seat positioned in the interior space that is configured to be moved from a position facing forwards into a position facing backwards when the vehicle is operated in an autonomous mode.

The object of the present invention is to create a method and a motor vehicle by means of which particularly safe automated driving of the motor vehicle can be realized.

A first aspect of the invention relates to a method for operating a motor vehicle, in particular a passenger vehicle, which can be operated in an automated driving mode. In the automated driving mode, the motor vehicle is driven automatically by means of a computing device, in particular of the motor vehicle. This means that, in the automatic driving mode, movements, in particular movement changes, of the motor vehicle can be caused in an automated or automatic manner by means of the computing device, i.e., without intervention by the driver of the vehicle. For example, in the automated driving mode, the longitudinal dynamics and/or the transverse dynamics of the motor vehicle are set, in particular regulated, by means of the computing device indifferent to the driver. In other words, in the automated driving mode, a longitudinal dynamic regulation and/or a transverse dynamic regulation, for example, take place by means of the computing device, such that acceleration and/or braking and/or direction changes of the motor vehicle, for example, are caused automatically by means of the computing device, i.e., without intervention by the driver.

Here, the motor vehicle has at least one first component and at least one motor allocated to the first component, the motor being formed as an electric motor, for example. The first component can be moved relative to at least one second component of the motor vehicle into different positions by means of the motor by the driver of the motor vehicle. This means that the first component can be powered by means of the motor, whereby the first component can be moved relative to the second component. Thus, the driver can move the first component relative to the second component into different positions via the motor, in particular move manually. Here, manual movement is to be understood as the driver not having to move the first component himself/herself or with his/her own strength relative to the second component, but the driver operating the motor, for example, via at least one operating element, in particular a button, whereby the motor powers the first component and moves it relative to the second component. As a result, the driver can move the first component into different positions as required via the motor, such that the driver can adjust the position of the first component to his/her needs.

The method comprises a first step in which at least one input for activating the automated driving mode is received. In a second step of the method, the current position of the first component is determined. For example, the second step is carried out temporally after the first step. The current position of the first component is a position, for example, in which the driver has manually moved the first component via the motor, i.e., by operating the motor. In other words, the current position of the first component is, for example, a position of the first component set by the driver. In a third step of the method, depending on the input received and the determined current position, an adjusting region comprising the determined current position is predetermined, within which adjusting region movements of the first component relative to the second component that are caused or that can be caused by the driver via the motor are permitted. In other words, the driver cannot, however, manually move the first component within the predetermined adjusting region, i.e., by operating the motor, beyond the predetermined adjusting region. This means, for example, that the movement or movability of the first component is limited or restricted to the adjusting region by predetermining the adjusting region. Thus, the driver can only move the first component in the predetermined adjusting region via the motor, such that the first component can only be moved by the driver via the motor into positions that are part of the predetermined adjusting region. The driver cannot move the first component via the motor into positions that are not part of the predetermined adjusting region.

Here, the predetermined adjusting region is a part of the total adjusting region within which the first component can be moved relative to the second component by the driver via the motor, i.e., manually, when the automated driving mode is deactivated. This means that, as a result of activating the automated driving mode, the adjusting region is predetermined such that, then, the driver can no longer move the first component via the motor in the total adjusting region, but only in a part of the total adjusting region, and, that is to say, in the predetermined adjusting region.

The knowledge underlying the invention is that the driver can be relieved of many control or driving tasks with the increasing automation of motor vehicles, since such driving tasks for driving the motor vehicle are taken on or carried out by the computing device as part of the automated driving mode. For example, the motor vehicle is moved completely automatically in the transverse or longitudinal direction in the automated driving mode formed as a partially automated mode by means of the computing device under border conditions. Here, however, the driver should be ready to take over at all times. The same applies to highly automated or fully automated driving modes.

"Ready to take over" is to be understood as the driver being ready to take over all driving tasks or the driving tasks that are carried out by means of the computing device as part of the automated driving mode on or after an automatic deactivation, for example, such that the driver can drive the motor vehicle completely on his/her own and in a safe manner after the deactivation of the automated driving mode of the motor vehicle.

In principle, it is assumed that the driver is responsible for driving or controlling the motor vehicle at all times, i.e., even when in the automated driving mode. For this reason, the driver should be in a seated position at all times and be able to comfortably react to different situations in traffic. For example, in order to optimally steer and operate a pedal of the motor vehicle, an upright seating position with a distance and an angle of a seating system on which the driver sits that are dependent on the person relative to the steering wheel and the pedal is advantageous. In addition, an optimal position of a seatbelt ensures an optimal safety function in the event of accidents.

When using or activating the automated driving mode, the driver may wish to maximize comfort. As part of this wish to maximize comfort, the driver may want to adjust the first component which is arranged, for example, in the interior space of the motor vehicle, and, here, to move it, for example, out of the current position relative to the second component. The current position is, for example, a position that allows the driver to safely carry out, in the manner described above, all tasks for driving the motor vehicle when the automated driving mode is deactivated. Since, with an activated automated driving mode, at least one part of the driving tasks is taken over by the computing device, the driver could change the current position in order to set a more comfortable position of the first component for the driver in comparison to the current position, via the motor.

If the movability or adjustability of the first component is not limited, for example, by predetermining the adjusting region, it is then possible, for example, for the driver to move the first component into a further position that is different to the current position which no longer allows the driver to take over the driving tasks that were carried out by the computing device during the automated driving mode within a sufficiently short amount of time after the end of the automated driving mode or after introducing the end of the automated driving mode.

If, for example, a particularly automatic deactivation, i.e., a particularly automatic end, of the automated driving mode is provided, then a take-over demand is communicated to the driver, for example, in the interior space of the motor vehicle. This take-over demand is communicated to the driver, for example, in an optical and/or acoustic and/or haptic manner and indicates to the driver that the automated driving mode is deactivated at a point in time after a predetermined or predeterminable period of time after the take-over demand. At the latest, at the point in time which is also called the take-over time, the driver should be able to take over the driving tasks for driving the motor vehicle from the computing device, since then the computing device does not take over the driving tasks or only takes over a part of them. Here, in particular the position currently set by the driver and different to the previous position enables the driver to take over the driving tasks at the point in time. If the first component is in an unfavorable position for example at the point in time when the driver is supposed to take over the driving tasks, then safe driving, for example, of the motor vehicle is not possible for the driver. Furthermore, when the first component is in an unfavorable position at the take-over point in time, the driver could be in an unfavorable position, which is unfavorable in terms of the effect of safety systems, in particular restraint systems such as airbags and seatbelts.

These problems and disadvantages can now be avoided by means of the method according to the invention, since the driver, furthermore, can only move the first component within the predetermined adjusting region and cannot move it beyond this. By predetermining the adjusting region, the driver can only set the first component into such a position that is different to the current position and from which the first component can move, up to the point in time, back into the current, determined position or into a position that is favorable for driving the motor vehicle. The position that is different to the current position in which the driver can set the first component via the motor, ensures, for example, a higher level of comfort for the driver in comparison to the current position, such that he/she can sit particularly comfortably in the interior space of the motor vehicle during the automated driving mode. At the same time, however, the position that is different to the current, determined position enables the first component to move back into the current position previously set, up to the point in time at which the driver is to take over the driving tasks, or can be moved into a position that is advantageous for taking over the driving tasks, such that the first component is in an advantageous position at the latest at the point in time at which the automated driving mode is in fact ended and the driver is to take over all driving tasks, the advantageous position enabling the driver to take over all driving tasks and allowing for safer guiding or driving of the motor vehicle.

Thus, the danger that the first component is in a position that is unfavorable for taking over the driving tasks at the take-over point in time can be kept minimal by means of the method. In particular, it can be ensured that the first component is in a position relative to the driver and/or that the driver himself/herself is in a position relative to the motor vehicle after the take-over demand and at the latest at the take-over point in time, preferably after the take-over demand and before the take-over point in time, which allows the driver to safely take over the driving tasks as well as safer driving of the motor vehicle.

Preferably, the adjusting region can be predetermined in such a way that the first component can be returned to the determined position within the adjusting region in good time within a system take-over time that can be predetermined. The system take-over time can, in particular, be predetermined in such a way that this corresponds to the time period between the communication of the take-over demand and the take-over point in time. Here, a pre-known common duration of time can be predetermined. This duration of time can be a few seconds, for example, i.e., ranging from 2 to 10 seconds, for example. As a result, a return of the first component to the determined position, i.e., into the starting position, that is ended in good time at the point in time of the take-over of the driving tasks by the driver is made possible.

In an advantageous embodiment of the invention, the determined position is stored. This storage makes it possible, for example, to move the first component, which is moved by the driver from the current, determined position into a different position via the motor, back into the stored and previous position in a particularly simple manner, such that a particularly high level of comfort and a particularly high level of safety can be achieved.

Here, it has been shown to be particularly advantageous when the stored position is recalled when ending the automated driving mode and the first component is automatically moved into the recalled position by means of the motor. If the driver moved the first component, for example after the activation of the automated driving mode, from the initial previous position into a different position, and if the automated driving mode is then ended or ending of the automated driving mode is introduced, such that the driver were to take over the driving tasks at the take-over point in time, then the first component can be automatically moved back from the different position into the previous, stored and recalled position, such that consequently, the driver himself/herself, for example, can be moved quickly, comfortably and safely into a location or position that is favorable for driving the motor vehicle. Thus, it can be ensured that the first component adopts a position that enables the driver to take over the driving tasks from the computing device already at the point in time.

In particular, the object underlying the invention is that the previous position initially set by the driver is a position which the driver has set via the motor and that enables the driver to advantageously and safely drive the motor vehicle. This advantageous previous position can now be set automatically.

In an advantageous embodiment of the invention, a seating system, in particular a backrest or a seat part of a seating system, is used as the first component. The seating system is, for example, a vehicle seat or individual seat which provides exactly one seat for the driver. Alternatively, it is conceivable that the seating system is a bench which provides a plurality of seats for occupants. By moving the seating system into the previous, stored and recalled position, it is possible to move the seating system at the point in time into a favorable position relative to the motor vehicle. Since the driver sits in the seating system, the driver himself/herself can be moved into a position which is favorable for driving the vehicle, in particular a sitting position, such that the driver adopts a position which enables him/her to safely drive the vehicle at the latest at the point in time.

The movements and thus settings of the first component, in particular the backrest, can take place, for example, via at least one lumbar support and/or at least one air chamber, wherein the lumbar support can be formed by such an air chamber. Here, the lumbar support can be formed as a multi-way lumbar support in order to achieve a high level of seating comfort. In order to move the first component, the air chamber is filled with air, for example. This takes place by means of a pump, by means of which the air is conveyed into the air chamber, wherein the pump is powered by means of the motor mentioned above. Furthermore, it is conceivable that the first component is a side plate of the seating system, in particular of the backrest.

Furthermore, the first component can be a headrest of the seating system which is held, for example, on the backrest and can be moved relative to the backrest. Here, it is conceivable that the headrest can be moved horizontally or in the vertical direction of the vehicle and/or vertically or in the transverse direction of the vehicle. Furthermore, it is conceivable that the first component is a part, in particular a lateral part, of the headrest which can be moved relative to a further part of the headrest. Thus, a particularly comfortable headrest can be provided. The first component can be, in particular, a component of a multi-contour seat, the contour of which, in particular the outer contour, on which an occupant can sit, can be varied by moving the first component, i.e., can be set.

Furthermore, the first component can be a massage element which can be moved by means of the motor. The movement can be understood to mean changing the first component, in particular the massage element, in terms of its volume, by a medium, in particular a gas such as air, for example, being conveyed into the massage element and being released from the massage element. The medium is conveyed, for example, by means of a pump that is powered by means of the motor.

A further embodiment is characterized in that a steering handle, in particular a steering wheel, is used as the first component for causing direction changes of the motor vehicle. As a result, the driver can take over the driving tasks from the computing device at the latest at the point in time.

In a further advantageous embodiment of the invention, a seatbelt of the motor vehicle is used as the first component. Hereby, a particularly high level of safety can be achieved since the seatbelt is in an advantageous position at the latest at the take-over point in time in order to hold the driver back, for example in the event of an accident.

Finally, it has been shown to be particularly advantageous when a mirror is used as the first component, in particular an exterior mirror or an interior mirror, of the motor vehicle. By moving the mirror into the previous, stored and recalled position, it is possible, for example, that the mirror adopts a favorable position relative to the motor vehicle and relative to the driver at the latest at the point in time, the position allowing the driver to safely drive the motor vehicle.

Furthermore, if the driver wishes, the first component, for example a seating system and/or a mirror and/or the steering wheel and/or a seatbelt and/or another component of the motor vehicle, can be brought or moved automatically into at least one respective, initially stored position or location by activating the automated driving mode. The driver could save this position in a preceding automated driving section or before the journey or based on previous journeys.

In other words, it is provided in an advantageous embodiment that, as a result of activating the automated driving mode, at least one position of the first component that is, in particular, initially stored, can be recalled, and the first component is automatically moved into the recalled position by means of the motor. This position is stored, for example, before activating the automated driving mode in terms of time, for example during a period of time preceding the activation of the automated driving mode, during which period of time the automated driving mode was activated.

A second aspect of the invention relates to a motor vehicle, in particular a passenger vehicle, having a computing device, by means of which the motor vehicle can be operated in an automated driving mode in which movements of the motor vehicle can be moved automatically by means of the computing device. The motor vehicle comprises at least one first component and at least one motor allocated to the first component, by means of which motor the first component can be moved relative to at least one second component of the motor vehicle into different positions by the driver of the motor vehicle. In order to achieve a particularly safe automated journey of the motor vehicle, the computing device is formed to receive at least one input for activating the automated driving mode. Furthermore, the computing device is formed to determine the current setting of the first component and, depending on the received input and the determined current position, predetermine an adjusting region comprising the determined current position, within which adjusting region movements of the first component relative to the second component that are caused or can be caused by the driver via the motor are permitted. Advantageous embodiments of the first aspect of the invention are to be regarded as advantageous embodiments of the second aspect of the invention and vice versa.

Further advantages, features and details of the invention arise from the description of a preferred exemplary embodiment below, as well as with the aid of the Figures. The features and combinations of features specified in the description above and the features and combinations of features specified in the description of the Figures and/or in the Figures only below can be used not only in the combination specified in each case, but also in other combinations or on their own without exceeding the scope of the invention.

DETAILED DESCRIPTION OF THE DRAWINGS

Figure 1:
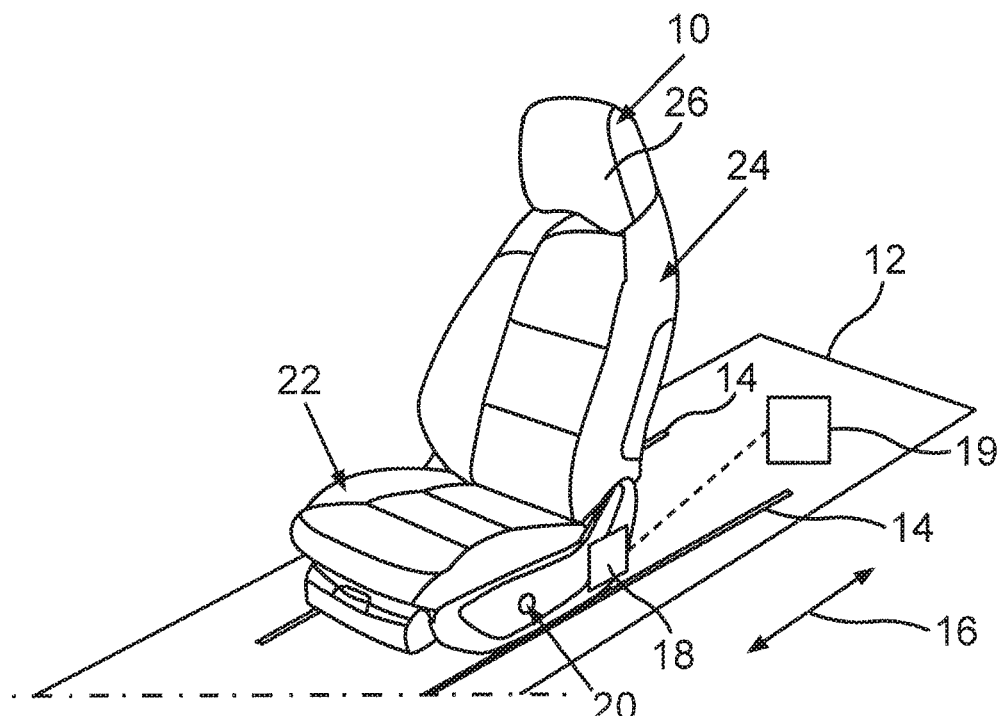
FIG. 1 is a schematic perspective view of a first component in the form of a seating system of a motor vehicle, wherein the seating system can be adjusted in an adjusting region by means of at least one motor, the adjusting region being limited to an adjusting region in the context of a method for operating the motor vehicle.

In a schematic perspective view, FIG. 1 shows a first component in the form of a seating system of a motor vehicle formed as a vehicle seat 10. In the manufactured state of the motor vehicle, the vehicle seat 10 is arranged in the interior space of the motor vehicle, wherein the vehicle seat 10 is the driver seat. This means that the driver of the motor vehicle sits on the vehicle seat 10 during a journey. The vehicle seat 10 is an individual seat. This means that the vehicle seat 10 provides exactly one seat for an occupant in the form of the driver. The embodiments above and below, however, can also be transferred to a seating system formed as a bench, wherein such a bench provides a plurality of seats, for example, for respective occupants.

The motor vehicle also comprises a second component which is presently formed as a floor element 12 of a floor of the motor vehicle that limits the bottom of the interior space in the vertical direction of the vehicle, the floor element 12 being schematically depicted, in particular, in FIG. 1. The vehicle seat 10 is, for example, held on the floor element 12 via seat rails 14 fixed to the floor element 12 and, here, can be moved relative to the floor element 12 along the seat rails 14 in the longitudinal direction of the vehicle. The longitudinal direction of the vehicle is illustrated by a double arrow 16 in FIG. 1, wherein the vehicle seat 10 can be moved, i.e., shifted, translationally in the longitudinal direction of the vehicle relative to the floor element 12. To do so, a motor, in particular schematically depicted in FIG. 1 and formed as an electric motor 18, is provided, by means of which motor the vehicle seat 10 can be moved along the seat rails 14 relative to the floor element 12. This means that the vehicle seat 10 can be powered by means of the motor and, as a result, can be moved relative to the floor element 12.

The driver sitting in the vehicle seat 10 thus does not have to shift the vehicle seat 10 along the seat rails 14 relative to the floor element 12 himself/herself, but rather the driver can operate the motor via an operating element 20, for example, and, as a result, cause movements of the vehicle seat 10 along the seat rails 14 relative to the floor element 12 via the motor. This means that the driver can move the vehicle seat 10 relative to the floor element 12 into different positions via the motor, wherein the vehicle seat 10 can be fixed in these different positions relative to the floor element 12. Here, it is possible that the driver sets a safe location or position of the vehicle seat 10 that is pleasant for him/her in the longitudinal direction of the vehicle relative to the floor element 12.

The vehicle seat 10 comprises seat components in the form of a seat part 22 and a back rest 24, wherein the backrest 24 can be moved, for example, relative to the seat part 22, in particular can be pivoted around a pivot axis. This movement of the backrest 24 relative to the seat part 22 can also be activated by means of the electric motor 18 and/or by means of a further motor, in particular an electric motor, that is different to the electric motor 18. The driver can also operate this further motor, for example, via the operating element 20, such that, for example, the backrest 24 can be moved relative to the seat part 22 by the driver via the further motor. As a result, the driver can set an advantageous location or position, i.e., an advantageous inclination of the backrest 24 in relation to the seat part 22. Here, the backrest 24, for example, is a first component of the motor vehicle, wherein the seat part 22 is a second component of the motor vehicle, such that the backrest 24 (first component) can be moved relative to the second component (seat part 22).

The vehicle seat 10 further comprises a headrest 26 which is presently placed on the backrest 24. Alternatively, it is conceivable that the headrest 26 can be moved by means of at least one motor, in particular an electric motor, relative to the backrest 24, in particular it can be pivoted. Then, the head rest 26, for example, is a first component, wherein the backrest 24 is a second component of the motor vehicle. Further first components of the motor vehicle are, for example, a seatbelt for holding the driver back, a steering wheel for causing direction changes of the motor vehicle and mirrors, for example in the form of exterior mirrors and an interior mirror, wherein also this first component can also be moved relative to respective second components by means of respective motors, in particular electric motors. Thus, the driver can move the respective first components relative to the respective second components via the respective motors, such that the driver can set positions of the first components that are advantageous for him/her.

Below, a method for operating the motor vehicle is explained, wherein the method is explained using the example of the vehicle seat 10 (first component). The embodiments below and above, however, can also be readily transferred to the other first components and second components.

The motor vehicle comprises, for example, a computing device which can have a plurality of computing units in the form of controllers. The motor vehicle can be operated in an automated driving mode by means of the computing device, in which driving mode the motor vehicle is driven automatically by means of the computing device. For example, the computing unit automatically carries out a longitudinal dynamic control and a transverse dynamic control of the motor vehicle, such that movements, in particular movement changes, of the motor vehicle are caused in an automated or automatic manner, i.e., without driver intervention, by means of the computing device. This means that, in the automated driving mode, the computing device takes over at least part of the driving tasks that are required for driving the motor vehicle, in particular driving longitudinally and transversely. In a normal mode that differs from the automated driving mode, the driver drives the motor vehicle. This means that, in the normal mode, the driver takes over the driving tasks for driving the motor vehicle that are taken over or carried out by the computing device in the automated driving mode. In other words, in the normal mode, the driver takes over at least one of the driving tasks that, in the automated driving mode, are taken over by the computing device.

If the automated driving mode is deactivated, then the vehicle seat 10 can be moved, for example, in a total adjusting region by the driver via the motor relative to the floor element 12, i.e., along the seat rails 14 in the longitudinal direction of the vehicle. In terms of the backrest 24, this means, for example, that the backrest 24 can be pivoted relative to the seat part 22 in a total adjusting region in a deactivated automated driving mode. The same can apply to the headrest 26 which can be pivoted and/or moved translationally in a total adjusting region relative to the back rest 24 in a deactivated automated driving mode. In terms of the respective mirror, the respective mirror can be pivoted in a total adjusting region relative to the respective second component, for example formed as a housing, for example in a deactivated automated driving mode. In terms of the seatbelt, this can be moved, in particular shifted and/or pivoted, in a total adjusting region relative to the respective second component, for example in a deactivated automated driving mode. The driver can cause this respective movement of the respective first component via the respective motor, such that the total adjusting region is available to the driver in each case, in which adjusting region the driver can move the respective first component via the respective motor. This means that the respective first component can be moved into a respective position in the total adjusting region via the motor when the automated driving mode is deactivated.

Figure 2:
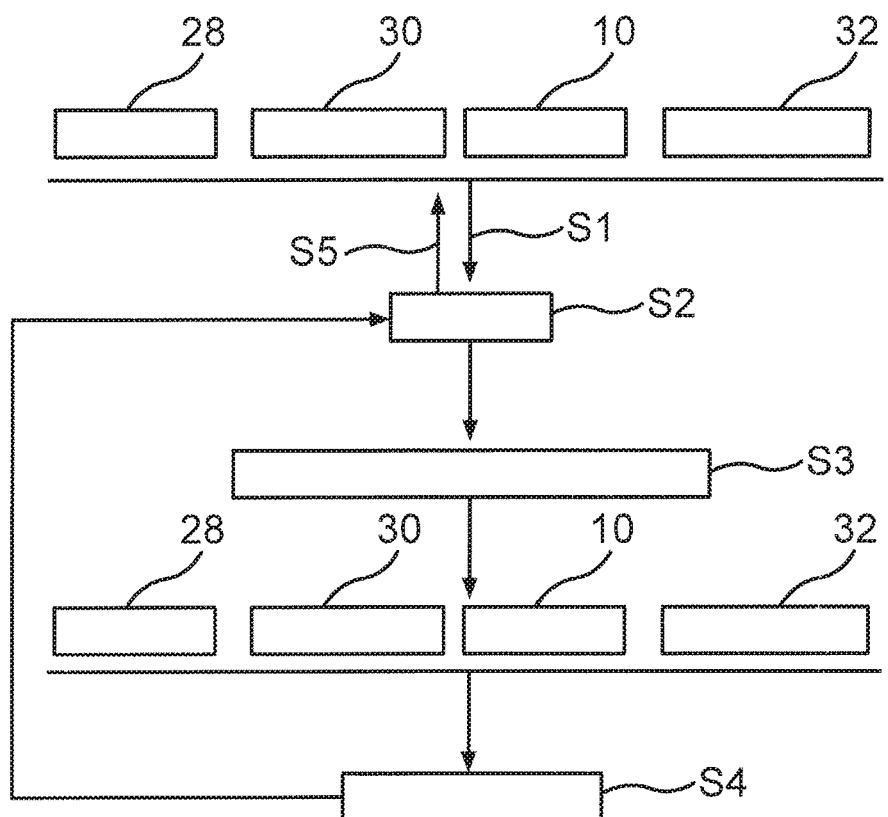
FIG. 2 is a flowchart to illustrate the method for operating the motor vehicle.

FIG. 2 shows a flowchart for illustrating the method. The seatbelt is schematically depicted in FIG. 2 and labelled with 28. Furthermore, the steering wheel is labelled with 30 and the respective mirror with 32.

In the first step S1 of the method, at least one input for activating the initially deactivated automated driving mode is received, for example by means of the computing device. For example, the driver activates the initially deactivated automated driving mode by the driver operating, in particular actuating, at least one operating element. By actuating the operating element, the driver switches on the automated driving mode which is, for example, an autonomous driving mode, wherein the operation of the operating element is detected in a first step S1. By detecting the actuation, the input for activating the automated driving mode is received.

In a second step S2 of the method which follows on from the first step S1, the current position of the respective first component (vehicle seat 10, backrest 24, headrest 26, seatbelt 28, steering wheel 30 and mirror 32) is determined. In other words, the driver moved the vehicle seat 10 into a position via the motor, for example temporally before the first step S1, wherein this position is comfortable for the driver and allows the driver to safely drive the motor vehicle. After the first step S1, in the second step S2, this current position of the respective first component set by the driver via the motor, i.e., in the present example of the vehicle seat 10, is determined. This takes place, for example, via at least one position sensor, by means of which the respective positions of the vehicle seat 10 can be detected. Alternatively or in addition, the determination of the current position takes place via storing values at least of one position of the motor. Furthermore, the determined position is stored, for example, in a storage device of the computing device.

In a third step S3 of the method, depending on the input received and the determined current position, an adjusting region comprising the determined current position, within which adjusting region movements of the vehicle seat 10 relative to the floor element 12 caused by the driver via the electric motor 18 are permitted, is predetermined. Transferred to the other first components, this means that respective adjusting regions are predetermined, within which the driver can move the first components relative to the respective second components via the respective motors. In terms of the vehicle seat 10, this means that, after carrying out the third step S3, the driver can only move the vehicle seat 10 via the motor in the predetermined adjusting region and not beyond this.

The predetermined adjusting region, here, is a part or a partial region of the total adjusting region described above, in which the vehicle seat 10 could be moved in principle. This means that, in the third step S3, the movability of the vehicle seat 10, i.e., the extent to which the vehicle seat 10 can be moved translationally relative to the floor element 12, is limited or bound in comparison to the total adjusting region. In other words, adjusting paths that are restricted to the first component are released, via which adjusting paths or along which adjusting paths the first components can be moved, wherein these limited adjusting paths are parts of the respective total adjusting regions and are thus smaller than the respective total adjusting regions. These limited acceptable adjusting paths or the adjusting region is or are calculated, for example, in particular depending on the determined position.

Temporally, after the third step S3, the driver can move the vehicle seat 10, for example, via the motor from the determined current position into a different second position relative to the floor element 12 along the seat rails 14, wherein this second position is more comfortable for the driver in comparison to the previous determined position. For better conceptual differentiation, the previous determined position, in which the vehicle seat 10 was set before adjusting the vehicle seat 10 into the second position, is called the first position. However, the second position is located within the predetermined adjusting region, such that the driver may not move the vehicle seat 10 excessively far away from the first position into a different position via the motor. In doing so, as will be explained in more detail below, it can be ensured that the vehicle seat 10 can be moved sufficiently quickly, i.e., in a sufficiently short amount of time, back into the first position from the second position when ending the automated driving mode.

An adjusting time, i.e., the time in which the vehicle seat 10 can be moved between different positions and thus, for example, from the second position into the first position, depends, for example, on the performance capability of the electric motor 18. Furthermore, an automatic, for example, movement of the vehicle seat 10 relative to the floor element 12 caused by the motor should not take place excessively quickly or with excessively great acceleration in order to ensure a safe and/or pleasant movement of the vehicle seat 10 relative to the floor element 12 for the driver. Thus, the predetermined adjusting region is determined, for example, depending on an amount of time that is required to move the vehicle seat 10 between two positions, and/or depending on the performance capability of the electric motor 18 and/or depending on a maximum acceleration acting on the driver when moving the vehicle seat 10 and/or on a maximum movement speed of the vehicle seat 10.

The calculation of the acceptable adjusting paths thus takes place within a safety region which ensures that a sufficiently quick and safe movement of the vehicle seat 10, for example from the second position back into the first position, is possible.

A so-called system take-over by the driver follows on from the movement of the vehicle seat 10 caused by the driver from the previous, first position into the second position. This means that the automated driving mode is ended automatically, for example, such that the driving tasks that the computing device takes over or took over during the automated driving mode, are handed back over to the driver, such that then, after ending or after deactivating the automated driving mode, the driver takes over all driving tasks once again.

Before the automated driving mode is actually ended, a take-over demand to the driver, for example, takes place. As part of this take-over demand, it is communicated to the driver haptically and/or optically and/or acoustically within the interior space that the automated driving mode is ended at a predetermined or predeterminable point in time after communicating the take-over demand. This means that there is a predetermined or predeterminable period of time of 2 to 10 seconds, for example, in particular 5 to 10 seconds, between the point in time which is also called the take-over point in time and the take-over demand. Thus, there is still a period of time after communicating the take-over demand to the driver in order to prepare for taking over the driving tasks from the computing device.

In a fourth step S4 of the method, when ending the automated driving mode, the stored position is recalled, and, in a fifth step S5, the vehicle seat 10 is automatically moved from the second position into the recalled position and thus into the previous, first position, by means of the electric motor 18. This means that an automatic return of the vehicle seat 10 from the second position into the first position takes place, such that, then, the vehicle seat 10 is in its first position that is advantageous for the driver to drive the vehicle at the latest at the take-over point in time, i.e., at the latest at the point in time in which the driver takes over the driving tasks from the computing device. Since the driver is sitting in the vehicle seat 10, the driver himself/herself is also moved into a favorable or advantageous position, in particular a sitting position, by moving the vehicle seat 10 into the first position, the sitting position allowing the driver to safely drive the motor vehicle from the take-over point in time. This automatic return of the individual partial components or elements here takes place on the basis of predefined adjusting hierarchies that preclude any discomfort or restriction of the driver during the adjusting process.

Since, in the third step S3, the adjusting region was predetermined and thus limited, it can be ensured that the second position is not excessively far away from the first position, such that, in turn, it can be ensured that, in the fifth step S5, the vehicle seat 10 can be moved sufficiently quickly and, in the present case, within the period of time between the point in time and the communication of the take-over demand, back into the first position by means of the electric motor 18. As a result, it can be ensured that the vehicle seat 10, and thus the driver, adopt a favorable position, at the latest, at the take-over point in time, the position allowing the driver to safely take over the driving tasks from the computing device and to safely drive the motor vehicle.

As a result, it can be prevented that the driver takes over the driving tasks in unfavorable positions of the first components. In other words, it can be ensured that the respective mirror 32, for example, is at an advantageous angle relative to the motor vehicle and, in particular, relative to the driver. Furthermore, advantageous relative positions of the driver to the steering wheel 30 and to a pedal of the motor vehicle can be ensured. Since the vehicle seat 10 is in the advantageous first position on taking over the driving tasks from the computing device, the driver does not have to excessively raise himself/herself up from the vehicle seat 10, in particular the seat part 22 and the backrest 24, in order to take over the driving tasks. In addition, the seatbelt 28 can be prevented from impeding the take-over or blocking the driver, in particular in the event of a rapid movement forwards.

Furthermore, the driver can be brought into a favorable position in which safety systems, such as airbags and other restraint systems, can deploy their full effect in the event of an accident. Overall, driver stress situations can be avoided, such that he can adequately react to an unexpected system take-over that was carried out automatically, for example. Thus, when taking over the driving tasks, sufficient overview of the traffic and sufficient comfort when driving the motor vehicle, i.e., during manual driving, can be provided to the driver. Here, it is assumed that the previous first position of the respective first component initially set by the driver is a position that is pleasant for the driver and advantageous for driving, in particular manual driving of the vehicle, and in which the respective first component is moved automatically in the event of a system take-over.

The predetermined adjusting region is a safety region which is chosen in such a way that the automatic return of the respective first component into the respective determined or stored position in the event of a system take-over can take place within the period of time, i.e., within a predeterminable system take-over time.

The system take-over time is predetermined, in particular, in such a way that is corresponds at least to the period of time between the communication of the take-over demand and the take-over point in time. Here, a known common time duration can be predetermined. This duration of time can be, for example, a few seconds, i.e., ranging from 2 to 10 seconds, for example.

As a result of the automatic return of the first component, a particularly high level of comfort of the system take-over can be achieved. Furthermore, an optimum position of the respective first component is generated for a safe control after the system take-over. As a result, the safety of all further occupants of the motor vehicle on system take-over is increased. In addition, it is ensured that the driver does not bring the first component and himself/herself into a dangerous position, since he can only move the first components during the automated driving mode within the respective predetermined adjusting regions, and not within the respective total adjusting regions. A further effect of the automated return of the first component into the respective first position is that the driver is prepared for the system take-over. Here, the automated driving mode can be formed as a partially automated driving mode, highly automated driving mode or fully automated driving mode.

As a result of the automatic return of the first component, the driver is supported in recognizing that—even in non-critical take-over situations—a take-over of the driving tasks is imminent. Thus, the driver can adapt to the current traffic situation even before the system take-over. Thus, the start of the automatic return already represents a communication of the take-over demand. As a result of the difference between the manually set first position and the manually set second position, from which the vehicle seat 10 is moved back into the first position, there is the additional advantage for the driver of easily recognizing which driving mode the motor vehicle is in. In other words, the driver can recognize whether the automated driving mode is activated or deactivated. Thus, this can be used in addition to differentiating between system modes depending on the automation state. In particular, an adjusting path and position difference between partially, highly and fully automated driving modes can be provided.

The invention claimed is:

1. A method for operating a motor vehicle that is operable in an automated driving mode in which the motor vehicle is driven automatically by a computing device, wherein the motor vehicle has a first component and a motor which is allocated to the first component, wherein the first component is movable via the motor by a driver of the motor vehicle relative to a second component of the motor vehicle into different positions, comprising the steps of:
   receiving an input for activating the automated driving mode;
   determining a current position of the first component; and
   depending on the received input and the determined current position, determining an adjusting region including the determined current position within which adjusting region movements of the first component caused by the driver via the motor relative to the second component are permitted.

2. The method according to claim 1, wherein the adjusting region is determined such that the first component is returnable to the determined current position within the adjusting region within a system take-over time that is predeterminable.

3. The method according to claim 1, further comprising the step of storing the determined current position.

4. The method according to claim 3, further comprising the steps of recalling the stored determined current position when ending the automated driving mode and automatically moving the first component into the recalled stored determined current position by the motor.

5. The method according to claim 1, wherein the first component is a seating system.

6. The method according to claim 1, wherein the first component is a steering handle.

7. The method according to claim 1, wherein the first component is a seatbelt.

8. The method according to claim 1, wherein the first component is a mirror.

9. The method according to claim 1, further comprising the steps of recalling a stored position of the first component as a result of the activation of the automated driving mode and automatically moving the first component into the recalled stored position by the motor.

10. A motor vehicle, comprising:
- a computing device, wherein the motor vehicle is operable in an automated driving mode in which movements of the motor vehicle are automatically caused by the computing device;
- a first component and a second component; and
- a motor allocated to the first component, wherein the first component is movable via the motor by a driver of the motor vehicle relative to the second component into different positions;
- wherein the computing device is configured to:
  - receive an input for activating the automated driving mode;
  - determine a current position of the first component; and
  - depending on the received input and the determined current position, determining an adjusting region including the determined current position within which adjusting region movements of the first component caused by the driver via the motor relative to the second component are permitted.

\* \* \* \* \*